May 5, 1931.  O. MEYER  1,803,913

AUTOMATIC WEIGHING MACHINE

Filed Jan. 23, 1928

Inventor
Otto Meyer
by
Attorney

Patented May 5, 1931

1,803,913

UNITED STATES PATENT OFFICE

OTTO MEYER, OF WETTELSWALDE, NEAR CRIMMITSCHAU, GERMANY

AUTOMATIC WEIGHING MACHINE

Application filed January 23, 1928, Serial No. 248,716, and in Germany January 25, 1927.

This invention relates to weighing apparatus and more particularly to weighing apparatus of the kind having rotatably mounted multi-compartment weighing vessels suitable for weighing flour and the like.

The multi-compartment weighing vessel is in the present case rotatably mounted on a shaft, each end of which is itself mounted in a beam forming part of the weighing mechanism of the apparatus, the arrangement being such that when one of the compartments in the weighing vessel is almost filled with the material to be weighed the weighing beam slowly sinks and consequently the weighing vessel moves downwardly and, when free to do so, rotates on its shaft and discharges the weighed contents of the compartment into a suitable receiver placed below the apparatus.

The object of the invention is to provide an improved construction as hereinafter described whereby repeated and accurate weighings are accomplished in a minimum of time.

The weighing apparatus as constructed in accordance with the invention has a closure member for controlling the supply of material to the weighing vessel and two stop arms or members mounted on a shaft associated with the closure member, the first stop arm being rigidly connected to the closure member and adapted to co-operate with a coacting stop member on the weighing vessel and the second stop arm being so constructed and arranged that, after the first stop arm, and hence the closure member, have been released by the stop member on the vessel, said stop member on the vessel is still engaged by the second stop arm and arrests the closure member before the supply of material is completely cut off, being released by the stop member on the vessel upon the completion of the weighing operation.

One novel feature of the invention is that only one stop is provided on the weighing vessel for each compartment thereof, the said stop releasing the two stop arms in sequence as the loaded vessel sinks under the weight of the material to be weighed.

For regulating the supply of material to the container when the closure member has been arrested in the position which allows only a small stream to pass, an adjustable abutment-pin may be provided to limit the angular movement of the closure member with regard to the second stop member.

In the accompanying drawings, in which a constructional example of the invention is shown:—

Figure 1:
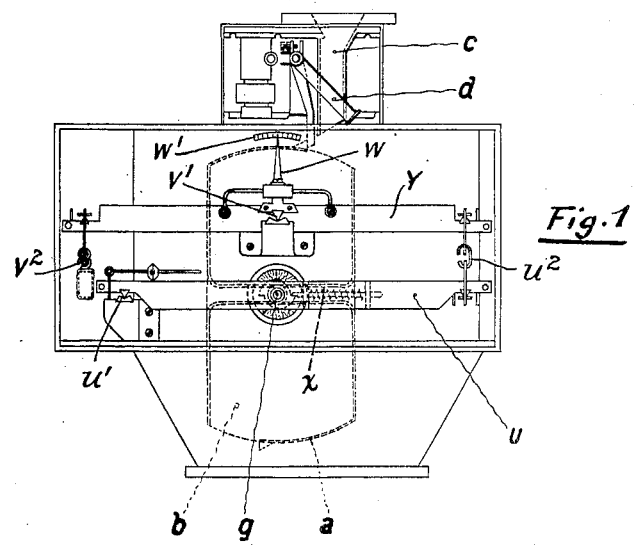
Figure 2:
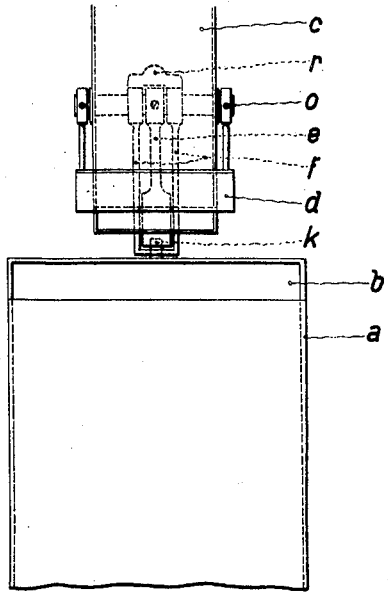
Figure 3:
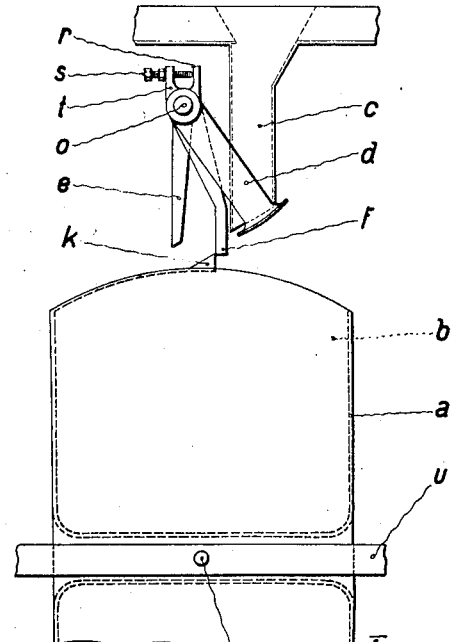

Fig. 1 shows the apparatus in side elevation at the commencement of a weighing operation, Fig. 2 is a partial front elevation of the apparatus shown in Fig. 1, Fig. 3 shows the two levers and the closure member in side elevation and on a larger scale and with the parts as they appear near the end of a weighing operation.

A multi-compartment weighing vessel $a$ is rotatably mounted on a shaft $g$ carried by the weighing beam $u$ and has a stop lug or member $k$ in the centre of the end wall of each compartment $b$. At the commencement of each weighing operation this stop lug $k$ is positioned against a stop arm $e$ which is rigidly connected with a shaft $o$ and a valve or closure member $d$ for a supply hopper $c$. In front of the arm $e$ is another stop arm $f$ which is so mounted on the shaft $o$ as to be rotatable thereon through a small angle. Owing to the pressure of the stop $k$ against the arm $e$ the closure member $d$ is at first held in the open position. As a result of the falling of the weighing vessel during the filling operation the arm $e$ is released and the closure member $d$ connected thereto falls under the action of gravity and closes the supply hopper $c$ except for a narrow opening. A complete closing is prevented because an adjustable abutment-pin $s$ mounted on an extension $t$ of the arm $e$ engages an extension $r$ on the second lever $f$ which is still engaged by the stop $k$. As a result of further sinking of the weighing vessel the arm $f$ is also released and the closure member $d$ completely closes the supply hopper $c$. The magnitude of the narrow opening may be altered as required for different materials to be weighed by adjusting the abutment-pin $s$ which screws into the extension $t$ of the arm $e$.

As shown, the beam $u$ is pivotally mounted at one end, as at $u'$, and connected by link $u^2$ at its opposite end with one end of an upper beam $v$, centrally pivoted at $v'$ and suitably weighted, as at $v^2$, at its opposite end. The beam $v$ carries a pointer or indicator $w$ for cooperation with a stationary graduated scale $w'$. The weighing vessel when released by stop member $f$ for a small period of time remains stationary, during which time period the valve $d$ closes and the compartment of the vessel in loading position receives the final amount of material which acts to overbalance the vessel for a half-revolution turning motion of the vessel to the right in Fig. 1 against the resistance of cushioning and detaining means, so as to reverse the positions of the compartments $b$, namely to bring the upper compartment into lower dumping position and the lower compartment into upper receiving position. The cushioning and detaining means, generally indicated at $x$, may be of any suitable type to cushion the vessel in its swinging movements and to yieldingly hold the vessel from movement during the loading operation and until the loading operation is completed.

Having now particularly described and ascertained the nature of my said invention and in what manner the same is to be performed I declare that what I claim is:—

1. A weighing apparatus comprising a weighing vessel mounted for rotary movement between receiving and discharging positions and for downward and upward movements under the weight of a load and when relieved of such weight, respectively, a feed conduit, a valve controlling the feed of material from said conduit to the vessel, and a pair of successively operating stop members supported for coacting with the valve to control the operation thereof, one of said stop members being engageable with the vessel to effect the opening of the valve and to hold it open until the vessel is filled to a predetermined degree and adapted to be released by a certain downward movement of the vessel under the weight of the material therein to permit the valve to partially close, and the other of said stop members being adapted for engagement with the vessel to hold the valve partly closed and adapted to be released upon a further downward movement of the vessel when loaded to the full extent desired to effect a closing of the valve.

2. A weighing apparatus of the character set forth in claim 1 wherein the weighing vessel is provided with compartments successively movable by rotation of the vessel into receiving and discharging positions, said vessel having a single stop member for each compartment and for successive engagement with the valve controlling stop members.

3. A weighing apparatus of the character set forth in claim 1 wherein the valve and the valve controlling stops are coaxially pivoted for oscillation in a predetermined arc and for simultaneous swinging movements in one direction or the other.

4. A weighing apparatus of the character set forth in claim 1 wherein one of the stops is adjustable to vary the extent of the initial part-closing action of the valve.

5. A weighing apparatus of the character set forth in claim 1 wherein the valve and one of the stop members are fixed with relation to each other and loose with respect to the other stop member for adjustment relative thereto, and an adjustable connection between the fixed and loose stop members to regulate the extent of adjustment.

OTTO MEYER.